(12) United States Patent
Liu

(10) Patent No.: US 10,039,136 B2
(45) Date of Patent: Jul. 31, 2018

(54) BASE STATION, SERVICE PROCESSING METHOD, AND CLOUD COMPUTING SYSTEM

(71) Applicant: Huawei Technologies Co., Ltd., Shenzhen (CN)

(72) Inventor: Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 14/256,212

(22) Filed: Apr. 18, 2014

(65) Prior Publication Data

US 2014/0226594 A1    Aug. 14, 2014

Related U.S. Application Data

(63) Continuation of application No. PCT/CN2012/082750, filed on Oct. 11, 2012.

(30) Foreign Application Priority Data

Oct. 21, 2011  (CN) .......................... 2011 1 0323739

(51) Int. Cl.
H04W 76/10 (2018.01)
H04W 76/02 (2009.01)
(Continued)

(52) U.S. Cl.
CPC ............. *H04W 76/02* (2013.01); *H04L 65/40* (2013.01); *H04L 67/1097* (2013.01);
(Continued)

(58) Field of Classification Search
CPC .... H04W 76/02; H04W 76/10; H04L 67/1097
See application file for complete search history.

(56) References Cited

U.S. PATENT DOCUMENTS 7,266,593 B2 *  9/2007  Faccin .............. H04L 29/06027
379/88.17
7,680,100 B1 *  3/2010  Corliss ................ H04L 12/4633
370/354
(Continued)

FOREIGN PATENT DOCUMENTS

CN      101247196 A      8/2008
CN      101505307 A      8/2009
(Continued)

OTHER PUBLICATIONS

Partial English Translation and Abstract of Chinese Patent Application No. CN102065573A, Jun. 12, 2014, 5 pages.
(Continued)

*Primary Examiner* — Hassan Kizou
*Assistant Examiner* — Deepa Belur
(74) *Attorney, Agent, or Firm* — Conley Rose, P.C.

(57) ABSTRACT

A base station, a service processing method, and a cloud computing system. The method includes: establishing a wireless network bearer channel with a UE; receiving a service request of the UE through the wireless network bearer channel; parsing a request content in the service request of the UE, and generating a cloud service access request according to a content, which needs to be processed by a cloud server end, in the request content; and sending the cloud service access request to the cloud server end, and returning a corresponding processing result of the cloud server end to the UE through the wireless network bearer channel. Therefore, a transport layer protocol and an access layer protocol on a user equipment side are terminated at a base station, so that in the embodiments of the present invention, inter-layer optimization is implemented.

19 Claims, 6 Drawing Sheets

(51) Int. Cl.
*H04L 29/08* (2006.01)
*H04L 29/06* (2006.01)
*H04W 36/08* (2009.01)
*H04W 4/60* (2018.01)

(52) U.S. Cl.
CPC ............. *H04W 76/10* (2018.02); *H04L 69/04* (2013.01); *H04W 4/60* (2018.02); *H04W 36/08* (2013.01)

(56) References Cited

U.S. PATENT DOCUMENTS

| | | | |
|---|---|---|---|
| 7,957,733 | B2 | 7/2011 | Wang et al. |
| 9,491,801 | B2* | 11/2016 | Donepudi ............. H04W 88/10 |
| 2005/0102300 | A1* | 5/2005 | Madsen ............ G06F 17/30902 |
| 2007/0280159 | A1 | 12/2007 | Liu et al. |
| 2010/0014451 | A1 | 1/2010 | Fujino |
| 2011/0075675 | A1* | 3/2011 | Koodli ..................... H04L 12/14 |
| | | | 370/401 |
| 2011/0271007 | A1* | 11/2011 | Wang .................... H04L 45/306 |
| | | | 709/238 |
| 2011/0307947 | A1* | 12/2011 | Kariv ....................... H04L 63/08 |
| | | | 726/9 |
| 2012/0039304 | A1* | 2/2012 | Kim ....................... H04W 28/08 |
| | | | 370/332 |
| 2012/0042216 | A1* | 2/2012 | Blubaugh ............. H04L 63/029 |
| | | | 714/48 |
| 2012/0106331 | A1* | 5/2012 | De Pasquale ....... H04L 12/6418 |
| | | | 370/230 |
| 2012/0140697 | A1 | 6/2012 | Chen et al. |
| 2012/0239771 | A1* | 9/2012 | Rasanen ............. H04L 65/1016 |
| | | | 709/206 |
| 2013/0019297 | A1* | 1/2013 | Lawson ................ H04W 76/02 |
| | | | 726/7 |
| 2013/0138814 | A1* | 5/2013 | Kotecha ................ H04L 67/10 |
| | | | 709/226 |
| 2014/0105103 | A1* | 4/2014 | Nethi .................. H04L 63/1408 |
| | | | 370/328 |
| 2014/0112143 | A1* | 4/2014 | Beale .................... H04W 72/04 |
| | | | 370/235 |
| 2015/0149530 | A1* | 5/2015 | Maret ................. H04L 67/2814 |
| | | | 709/203 |
| 2015/0156814 | A1* | 6/2015 | Yie ....................... H04W 80/06 |
| | | | 370/329 |

FOREIGN PATENT DOCUMENTS

| | | |
|---|---|---|
| CN | 101557551 A | 10/2009 |
| CN | 101958910 A | 1/2011 |
| CN | 101998679 A | 3/2011 |
| CN | 102065573 A | 5/2011 |
| EP | 2362599 A1 | 8/2011 |
| WO | 2005086509 A1 | 9/2005 |
| WO | 2010062095 A3 | 6/2010 |
| WO | 2010128773 A2 | 11/2010 |

OTHER PUBLICATIONS

Foreign Communication From a Counterpart Application, PCT Application No. PCT/CN20121082750, English Translation of International Search Report dated Nov. 29, 2012, 2 pages.
Foreign Communication From a Counterpart Application, PCT Application No. PCT/CN20121082750, English Translation of Written Opinion dated Nov. 29, 2012, 6 pages.
Oyman, O., et al., "Distortion-Aware MIMO Link Adaptation for Enhanced Multimedia Communications," IEEE 21st International Symposium on Personal, Indoor and Mobile Radio Communications Workshops, Sep. 26-30, 2010, pp. 387-392.
Partial English Translation and Abstract of Chinese Patent Application No. CN101557551A, Dec. 26, 2014, 56 pages.
Foreign Communication From a Counterpart Application, Chinese Application No. 201110323739.2, Chinese Search Report dated Nov. 28, 2014, 2 pages.
Foreign Communication From a Counterpart Application, Chinese Application No. 201110323739.2, Chinese Office Action dated Dec. 9, 2014, 7 pages.
Foreign Communication From a Counterpart Application, European Application No. 12842180.7, Extended European Search Report dated Apr. 7, 2015, 10 pages.

* cited by examiner

BASE STATION, SERVICE PROCESSING METHOD, AND CLOUD COMPUTING SYSTEM

CROSS-REFERENCE TO RELATED APPLICATIONS

This application is a continuation of International Application No. PCT/CN2012/082750, filed on Oct. 11, 2012, which claims priority to Chinese Patent Application No. 201110323739.2, filed on Oct. 21, 2011, both of which are hereby incorporated by reference in their entireties.

TECHNICAL FIELD

Embodiments of the present invention relate to the field of communications technologies, and in particular, to a base station, a service processing method, and a cloud computing system.

BACKGROUND

The mobile Internet based on a conventional mobile communications system is formed by a radio access network (RAN) and a mobile core network (CN). The RAN is responsible for providing wireless access for a user equipment (UE), and the CN provides a fixed Internet Protocol (IP) access point for the user equipment through mobility management. In this way, the user equipment accesses an external IP network through a mobile communications network, and accesses an application server (AS) through the external IP network. The user equipment usually provides a client function, and an application of the application server is provided by an application provider.

From the perspective of an application provider (an Internet Service Provider (ISP)), many small and medium ISPs provide an application service externally still in manners such as server hosting and bandwidth renting, where an ISP directly rents a server and a network bandwidth, or an ISP purchases a server and its supporting software and rents a network bandwidth to provide an application service externally.

From the perspective of a terminal user, a mobile Internet application is in great need of a storage service and a computing service in addition to an access service of a pipe. The storage service refers to storing user data, which includes formatted data such as a picture, a video, a data file, and an electronic mail. The computing service refers to providing office software (such as word processing software), Computer Aided Design (CAD)/Computer Aided Manufacturing (CAM)/Computer Aided Engineering (CAE) software, a network game, and so on. Currently, a user-specific storage service and computing service are mainly provided by a user equipment, but are obviously limited by an extremely limited computing and storage capability of the user equipment such as a mobile phone.

A main problem of the mobile Internet based on a conventional mobile communications system lies in that the mobile communications system is fully pipelined. That is, only an IP access channel is provided, and application-related information, such as service properties of an application (Quality of Service (QoS) information such as a service type, a maximum rate, and an average rate), and signal source coding information of a service (such as a video streaming service), cannot be obtained directly from an application server. Therefore, an application and a pipe are separated, a RAN network element such as a base station provides only an access layer function, and inter-layer optimization of an application layer and a transport layer (Transmission Control Protocol (TCP)/User Datagram Protocol (UDP)) and an access layer is very difficult to implement.

SUMMARY

Embodiments of the present invention provide a base station, a service processing method, and a cloud computing system, so as to improve system performance.

In one aspect, a base station is provided and includes: a wireless network function module configured to establish a wireless network bearer channel with a UE; a receiving module configured to receive a service request of the UE through the wireless network bearer channel; and a first processing module configured to parse a request content of the service request of the UE, generate a cloud service access request according to a content, which needs to be processed by a cloud server end, in the request content, send the cloud service access request to the cloud server end, and return a corresponding processing result of the cloud server end to the UE through the wireless network bearer channel.

In another aspect, a service processing method is provided and includes: establishing a wireless network bearer channel with a UE; receiving a service request of the UE through the wireless network bearer channel; parsing a request content in the service request of the UE, and generating a cloud service access request according to a content, which needs to be processed by a cloud server end, in the request content; and sending the cloud service access request to the cloud server end, and returning a corresponding processing result of the cloud server end to the UE through the wireless network bearer channel.

In another aspect, a cloud computing system is provided and includes multiple cloud server ends. The multiple cloud server ends are interconnected, and each cloud server end is connected to one or more base stations described in the foregoing.

In the embodiments of the present invention, a wireless network bearer channel is established between a base station and a user equipment, so as to terminate an access layer protocol of the user equipment. In addition, from the perspective of a transport layer protocol, the base station in the embodiments of the present invention does not simply forward a service request of the user equipment, but parses a request content in the service request, and performs processing according to the request content, or for a content that needs to be processed by a cloud server end, requests the cloud server end to help perform processing, so that the base station terminates a transport layer protocol of the user equipment. In this way, a transport layer protocol and an access layer protocol on a user equipment side are both terminated at a base station, so that in the embodiments of the present invention, inter-layer optimization of a transport layer and an access layer can be implemented.

BRIEF DESCRIPTION OF DRAWINGS

To describe the technical solutions in the embodiments of the present invention more clearly, the following briefly introduces the accompanying drawings required for describing the embodiments. The accompanying drawings in the following description show only some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The embodiments to be described are only a part rather than all of the embodiments of the present invention. All other embodiments obtained by persons of ordinary skill in the art based on the embodiments of the present invention without creative efforts shall fall within the protection scope of the present invention.

A user-specific storage service and computing service are mainly provided by a user equipment, but are obviously limited by an extremely limited computing and storage capability of the user equipment such as a mobile phone. Currently, a trend of providing this kind of services through cloud computing emerges.

Cloud computing is a service operating mode in which a shared network delivers an information service. A cloud vividly depicts a sum of an information service infrastructure including a network, computing and storage, and software such as a related operating system, an application platform, a Web (network) service and application. In cloud computing, software and hardware of a system are both virtualized and encapsulated into a service, which can be accessed and used by a user equipment through a network. A user of a cloud service sees only the service, and does not need to be concerned about specific implementation of a related infrastructure, including a geographical location, resource distribution and management, and software and hardware platforms. A hardware infrastructure of cloud computing is typically a data center (Data Center), or multiple interconnected data centers, or a server cluster formed by computers distributed in different geographical locations. A software infrastructure of cloud computing is responsible for virtualization of the hardware infrastructure, resource management and monitoring, security and accounting management, and so on, so as to encapsulate software and hardware infrastructures into a service and provide the service to a user.

Figure 1:
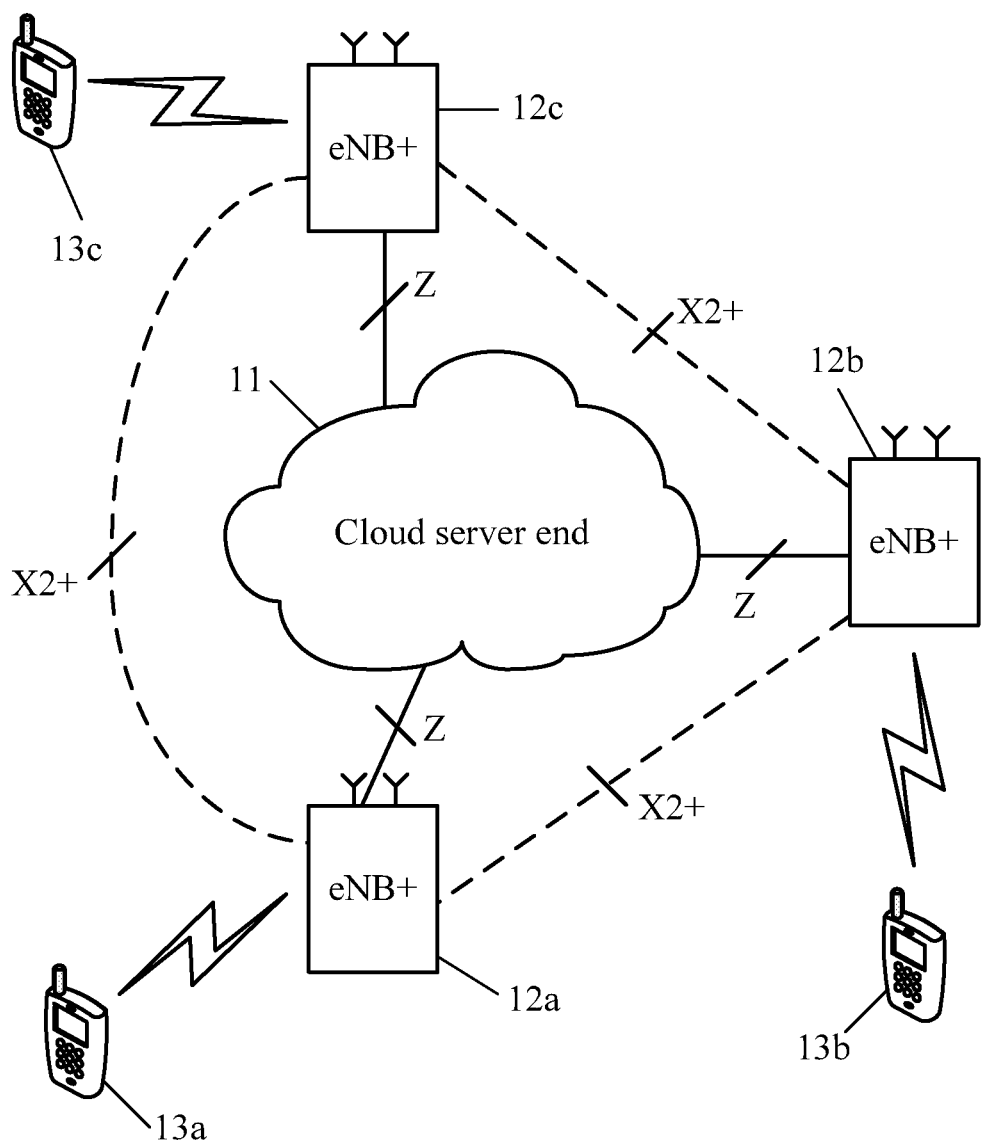
FIG. 1 is a schematic structural diagram of a cloud computing system according to an embodiment of the present invention.

FIG. 1 is a schematic structural diagram of a cloud computing system 10 according to an embodiment of the present invention. In FIG. 1, a cloud server end (or called "central cloud") 11 typically runs on a high-performance data center or multiple interconnected data centers. eNB+ 12a, 12b, and 12c are enhanced base stations according to the embodiment of the present invention, and implement all wireless network functions for user equipments 13a, 13b, and 13c, which include access layer and non-access layer functions. The eNB+ and the cloud server end 11 are connected to each other through a high-speed broadband IP line (collectively called an interface Z). Logical interfaces between the eNB+ 12a, 12b, and 12c are X2+, and are used to support inter-eNB+ mobility management.

The number of various network elements shown in FIG. 1 is only exemplary, but is not intended to limit the scope of the embodiment of the present invention. For example, the cloud computing system 10 may include one or more cloud server ends 11, each cloud server end may be connected to one or more eNB+, and each eNB+ may serve one or more UEs.

Figure 2:
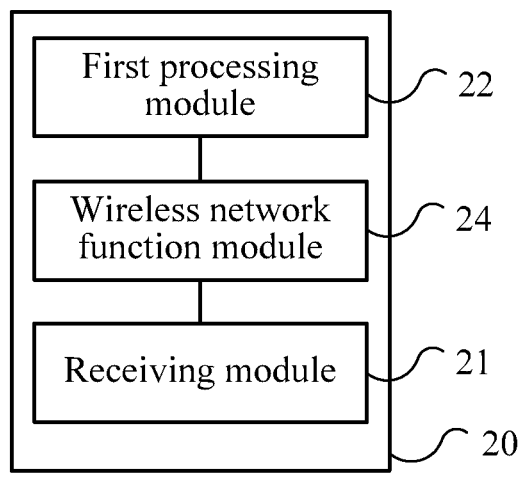
FIG. 2 is a block diagram of a base station according to an embodiment of the present invention.

FIG. 2 is a block diagram of a base station according to an embodiment of the present invention. A base station 20 shown in FIG. 2 is an example of the eNB+ shown in FIG. 1, and includes a receiving module 21, a first processing module 22, and a wireless network function module 24.

The wireless network function module 24 establishes a wireless network bearer channel with a UE (for example, the user equipments 13a, 13b, and 13c shown in FIG. 1). In this way, the base station 20 can terminate an access layer protocol of the UE.

The receiving module 21 receives a service request of the UE through the wireless network bearer channel. For example, the receiving module 21 may be implemented as an antenna on the base station 20.

The first processing module 22 parses a request content of the service request of the UE, generates a cloud service access request according to a content, which needs to be processed by a cloud server end, in the request content, sends the cloud service access request to the cloud server end (for example, the cloud server end 11 shown in FIG. 1), and returns a corresponding processing result of the cloud server end to the UE through the wireless network bearer channel. For example, the first processing module 22 may be implemented as a base band processing unit on the base station 20.

After obtaining the request content through parsing, the base station decides how to perform processing. For example, for a content that can be processed by the base station, such as inter-layer optimization, joint coding processing, and data compression/aggregation/buffering, the base station may perform the processing. For a content that needs to be processed by a cloud server end, such as data storage/computing, the base station may send a cloud service access request to a corresponding cloud server end, so as to request the cloud server end to perform corresponding processing. In this way, from the perspective of the user equipment, it is like that an application server is located in the base station. The user equipment sends a service request directly to the base station. That is, the base station terminates a transport layer protocol of the user equipment. However, in the prior art, a user equipment sends a service request to an application server, but a base station does not parse a request content in the service request, and simply searches for a route and forwards the service request according to information such as a destination address of the service request (the information is usually in a packet header of a service request packet).

In conclusion, in the embodiment of the present invention, a wireless network bearer channel is established between a base station and a user equipment, so as to terminate an access layer protocol of the user equipment. In addition, from the perspective of a transport layer protocol, the base station in the embodiment of the present invention does not simply forward a service request of the user equipment, but parses a request content in the service request, and performs processing according to the request content, or requests a cloud server end to help perform processing, so that a transport layer protocol and an access layer protocol of a user equipment side are both terminated at a base station. Therefore, in the embodiment of the present invention, inter-layer optimization of a transport layer and an access layer can be implemented.

Figure 3:
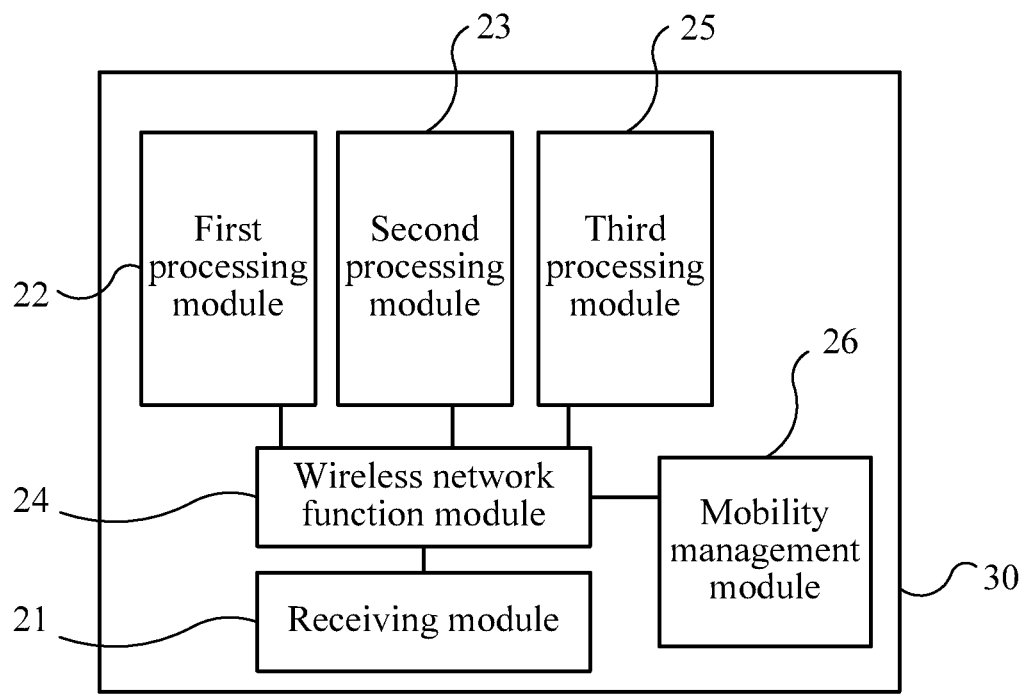
FIG. 3 is a block diagram of a base station according to another embodiment of the present invention.

FIG. 3 is a block diagram of a base station according to another embodiment of the present invention. A base station 30 shown in FIG. 3 is an example of the eNB+ shown in FIG. 1, and is different from the base station 20 shown in FIG. 2 in that, in addition to the wireless network function module 24, the receiving module 21, and the first processing module 22, the base station 30 further includes at least one of a second processing module 23, a third processing module 25, and a mobility management module 26.

The second processing module 23 is connected to a cloud server end, and obtains a function control service of a wireless network bearer channel from the cloud server end in a cloud computing manner. For example, the function control service of the wireless network bearer channel may include a locating service, such as location calculation; and subscriber subscription data storage and query, which includes functions of a Home Location Register (HLR)/Home Subscriber Server (HSS) and an Authentication, Authorization and Accounting (AAA)) server, policy control and an accounting function.

The wireless network function module 24 is connected to the first processing module 22 and the second processing module 23, and establishes one or more wireless network bearer channels with a UE by implementing an existing wireless network access layer protocol and non-access layer protocol. Typical functions of a wireless access layer include functions of protocols such as a physical layer (PHY), a media access control layer (MAC), a radio link layer (Radio Link Control (RLC)), and a packet data convergence layer (Packet Data Convergence Protocol (PDCP)), and are used to transmit a user IP data packet through an air interface. Wireless non-access layer functions typically include functions of an L3 protocol and a packet data network gateway (PDN-GW or PGW). The L3 protocol corresponds to an L3 protocol on a user equipment UE side, and is used to control operations such as establishment, modification, and deletion of a wireless access bearer. The packet data network gateway provides functions of an IP gateway, such as IP address assignment, network address translation (NAT), and policing control of user data. In this way, an interface on a wireless non-access layer is an IP interface. Therefore, the wireless network function module 24 may exchange application-related information with the first processing module 22, and the wireless network function module 24 may exchange wireless network control-related information with the second processing module 23.

As an optional embodiment, the first processing module 22 may obtain application-related information such as application property information and/or signal source coding information of a service corresponding to a service request. For example, in a case that a service request of a UE may carry application property information and/or signal source coding information of a service corresponding to the service request, the first processing module 22 may obtain the application-related information when parsing a request content in the service request of the UE. Alternatively, the first processing module 22 may also obtain the application-related information from other sources (for example, a cloud server end or a cloud service entity corresponding to an application), which is not limited in the embodiment of the present invention. The wireless network function module 24 may obtain the application property information and/or the signal source coding information from the first processing module 22, and realize QoS guarantee by using the application property information and/or the signal source coding information.

In another aspect, the wireless network function module 24 may obtain application-related information such as real-time status information of a wireless link and/or a wireless resource on the wireless network bearer channel. The wireless network function module 24 may obtain the real-time status information of the wireless link and/or the wireless resource in any existing manner, which is not limited in the present invention. The first processing module 22 may also obtain the real-time status information of the wireless link and/or the wireless resource from the wireless network function module 24, and complete inter-layer joint optimization of a transport layer and an access layer according to the real-time status information of the wireless link and/or the wireless resource.

In addition, when the wireless network function module 24 establishes the wireless network bearer channel with the UE, reference may be made to the application-related information.

In this way, a transport layer protocol and an access layer protocol of a UE side are both terminated in the base station 30, so that the base station 30 can implement inter-layer optimization of a transport layer and an access layer.

As another optional embodiment, the first processing module 22 may further provide the real-time status information of the wireless link and/or the wireless resource for a third-party application, so that the third-party application performs inter-layer optimization by using the real-time status information of the wireless link and/or the wireless resource. The third-party application may be an application that runs on a data center and a corresponding software platform that are provided by an operator, and may also be an application from a data center and a corresponding software platform of another operator, or an application on a data center and a corresponding software platform of some large companies, which is not limited in the present invention.

The third processing module 25 provides a proxy service for a cloud computing application on the UE. Specifically, the third processing module 25 may aggregate, compress, or buffer data between the UE and a corresponding cloud service entity; and when receiving a request that is for the data and is sent by the UE to the cloud service entity, send the data to the UE, and stop forwarding the request to the cloud service entity. For example, the third processing module 25 is designed for some cloud computing applications on the UE. In this kind of cloud computing applications, a local storage service and a local computing service of the UE (for example, storage of private data of a user, which includes formatted data such as a picture, a video, a data file and an electronic mail, and local large application software such as office software, CAD/CAM/CAE software, and a network game) may be provided in a cloud computing manner. Typically, forms such as Software as a Service (SaaS) and Platform as a Service (PaaS) may be adopted. In this case, the third processing module 25 integrated in the base station 30 functions as a proxy server, including terminating a transport layer protocol (TCP/UDP) of a cloud tenant on the UE side and implementing inter-layer joint optimization of a transmission control protocol layer and a wireless access layer; or is configured to aggregate, compress and/or buffer data between a cloud tenant on the UE and a corresponding cloud service entity.

As another optional embodiment, when the UE undergoes an inter-base station wireless access layer handover and/or wireless non-access layer relocation, and at the same time when a first processing module (which is assumed to be marked with 22a) of a current base station serves the UE, the mobility management module 26 starts a copy of the first processing module 22a in a first processing module (which is assumed to be marked with 22b) of a target base station, and synchronizes the first processing module 22a and the first processing module 22b to a corresponding application in the cloud server end. If communication of the UE in the current base station involves other modules, such as the second processing module 23, the wireless network function module 24, and the third processing module 25, a handover or relocation operation is also similarly performed.

In an existing mobile communications network, an application and a pipe are separated, aRAN network element such as a base station provides only an access layer function, inter-layer optimization of an application layer and a transport layer (TCP/UDP) and an access layer is very difficult to implement, and it is also impossible to provide effective QoS guarantee for a service. In addition, a mobile Internet architecture based on a conventional mobile communications system makes a mobile operator can provide only a pipe access service, so that a service scope of the mobile operator is limited, thereby making the mobile operator be in a low-end position in a whole industry value chain.

The base station 30 in the embodiment of the present invention completes access layer and non-access layer functions, terminates a transport layer protocol of an application on a UE side, and implements an organic combination of a pipe and a cloud, which on one hand facilitates implementation of an inter-layer optimization technology and QoS management and on the other hand expands a service scope of a mobile operator, so that the mobile operator not only can provide a pipe service, but also can provide information services such as storage and computing.

For example, when a user equipment requests a video service, the base station 30 may parse a request of the video service to obtain related request content information, such as a video identifier and required resolution. The base station 30 may request a cloud server end storing the video to transmit the video. When resolution of a received video does not conform to the required resolution, the base station 30 may further request a cloud server end that can process the video to process the video, so as to conform to the resolution required by the user equipment. Then, the base station 30 returns a processed video to the user equipment. The processing is controlled by the base station 30, thereby facilitating the implementation of the inter-layer optimization technology and the QoS management. However, it should be noted that the foregoing example only describes a possible manner for implementing the present invention, but is not restrictive. According to a cloud service network architecture or interaction mechanism between the base station 30 and the cloud server end, a content that can be processed by the base station 30 and a processing manner may be adjusted accordingly.

The embodiments of the present invention are described in further detail in the following with reference to specific examples.

Figure 4:
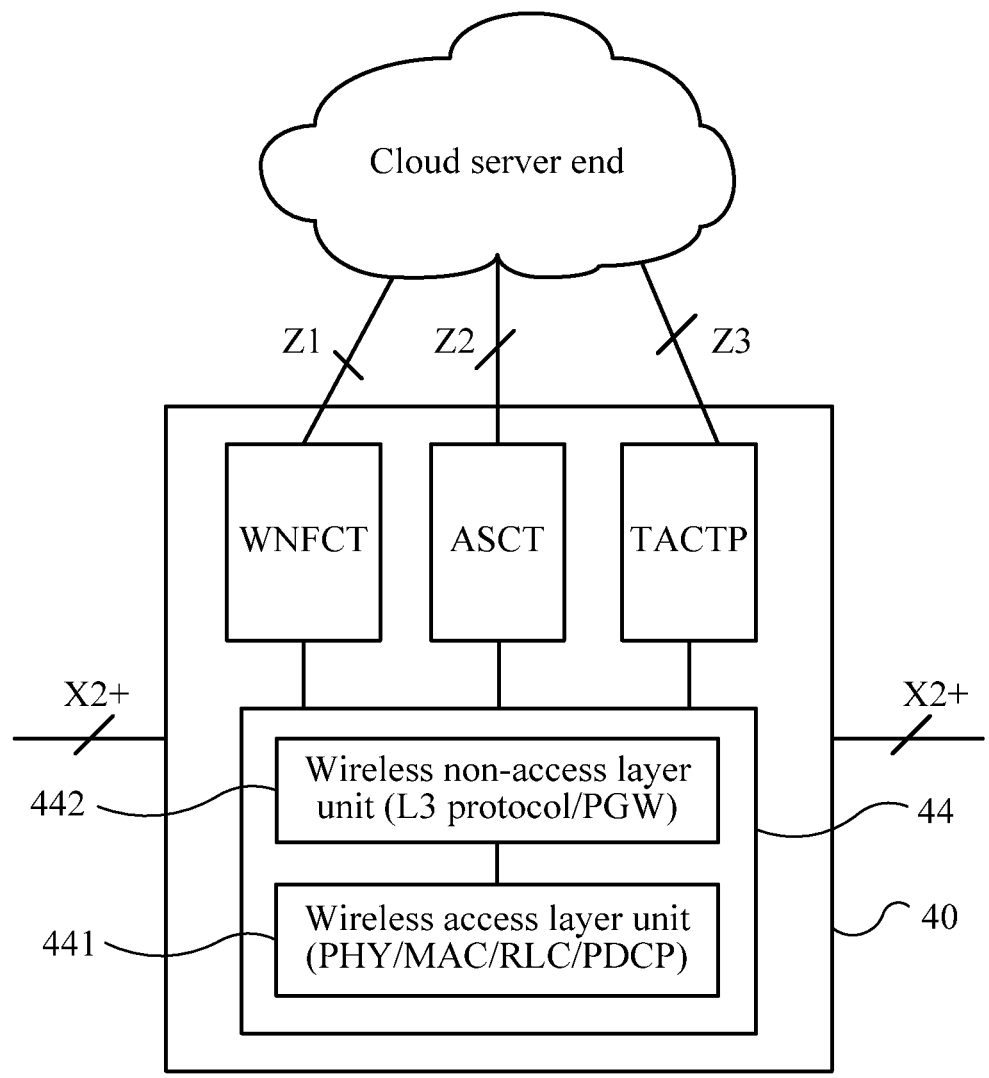
FIG. 4 is a schematic structural diagram of an internal functional structure of a base station according to an embodiment of the present invention.

FIG. 4 is a schematic structural diagram of an internal functional structure of a base station according to an embodiment of the present invention. A base station 40 shown in FIG. 4 is an example of the eNB+ shown in FIG. 1, and is a specific implementation form of the base stations 20 and 30.

As shown in FIG. 4, a wireless network function module 44 of the base station 40 is an example of the wireless network function module 24 shown in FIG. 3, and includes a wireless access layer unit 441 and a wireless non-access layer unit 442.

Functions of the wireless access layer unit 441 typically include functions of protocols such as PHY, MAC, RLC, and PDCP, and are used to transmit a user IP data packet through an air interface. Functions of the wireless non-access layer unit 442 typically include functions of an L3 protocol and a PGW. The L3 protocol corresponds to an L3 protocol on a user equipment UE side, and is used to control operations such as establishment, modification, and deletion of a wireless access bearer. The PGW provides functions of an IP gateway, such as IP address assignment, NAT, and policing control of user data. In this way, an interface on the wireless non-access layer unit 442 is an IP interface.

As shown in FIG. 4, three functional entities are included on the wireless non-access layer unit 442, namely, an application server cloud tenant Application Server Cloud Tenant (ASCT), a wireless network function cloud tenant Wireless Network Function Cloud Tenant (WNFCT) and a terminal application cloud tenant proxy Terminal Application Cloud Tenant Proxy (TACTP), which are respectively used as instances of the first processing module 22, the second processing module 23, and the third processing module 25 shown in FIG. 3.

Interfaces of the WNFCT, the ASCT, and the TACTP to a cloud server end (a central cloud) are Z1, Z2, and Z3 respectively. The WNFCT obtains wireless network function-related services from the central cloud in a cloud computing manner, such as a locating service (such as location calculation), subscriber subscription data storage and query (including functions of an HLR/HSS and an AAA server), policy control and an accounting function. In the prior art, these functions are all completed by specific network elements, but in the embodiment of the present invention, these functions are all completed by a data center through a virtual server by adopting a cloud computing manner. Cloud ends of these functions are integrated in the base station 40, and the base station 40 obtains the wireless network function-related control services from the central cloud through the WNFCT.

A function of the ASCT may include adopting a cloud computing manner, in which through a cloud end of an application server integrated in the base station 40, a data center provides a function of the application server (AS) in a form such as a virtual server. In this way, a transport layer (TCP/UDP) of a Client of a mobile broadband application on the UE side is terminated at an ASCT function entity in the base station 40. From the perspective of the UE, the application server is located in the base station 40. An ASCT function is integrated in the base station 40, and therefore, the wireless network function module 44 in the base station 40 may obtain application-related information through an internal interface with the ASCT, such as application properties of a service (QoS information such as a service type, a maximum rate, and an average rate) and signal source coding information of the service (such as a video streaming service), so as to provide effective QoS guarantee for the service. Meanwhile, the ASCT terminates the transport layer protocol of the Client of the mobile broadband application on the UE side, and real-time status information of a wireless link and a wireless resource (such as code modulation information of the wireless link, a wireless channel condition, and an air interface load status) may be obtained from the wireless network function module 44 in the base station 40, and therefore, the base station 40 may implement inter-layer joint optimization of a transport layer (TCP/UDP) and a wireless access layer, thereby making full use of a wireless resource and maximizing a system throughput. For the inter-layer joint optimization of the transport layer (TCP/UDP) and the wireless access layer, reference may be made to a larger number of existing technologies, such as "WIRELESS COMMUNICATION INTER-LAYER DESIGN—FROM PRINCIPLE TO APPLICATION" (ISBN 978-7-115-22781-2) compiled by Zhang Haixia et al.

In addition, the ASCT can further implement channel-source joint coding for a service including media such as a video and an image by using real-time status information of a wireless link and a wireless resource of a wireless network bearer channel obtained from the wireless network function module 44 in the base station 40, that is, jointly select an optimal coding manner and coding rate of the media such as the video and the image, and a channel coding manner and modulation manner of the wireless link according to the real-time status information of the wireless link (for example, a signal to interference/noise power ratio (SINR)) and based on principles of a maximum system throughput and ensuring of unchanged user experience. By contrast, in the prior art, selection of a channel coding and modulation manner of a wireless link and selection of a coding manner and rate of media such as a video and an image are completely independent, which cannot make effective use of an air interface resource to maximize system capacity. For details of channel-source joint coding technology in a wireless network, reference may be made to a large number of existing technologies, such as O. Oyman and J. Foerster, Distortion-Aware MIMO Link Adaptation for Enhanced Multimedia Communications, WiMAGIC-Huawei Workshop, Towards IMT-A and Beyond, PIMRC 2010.

It can be seen that, for WNFCT and ASCT functions in a cloud computing manner, partial data storage (such as subscriber service subscription information, user account information, and user location information) and computing functions (such as data base searching and query and data encryption) in a wireless network in the prior art, such as an original HLR/HSS, a policy and charging rules function (PCRF), a location server, a presence server, and an AAA server, and storage (such as a video source and Web application data) and computing functions (such as video coding, dynamic web page generation, and organization/management/processing of various application information) of an application server located on an application layer are all provided in a cloud computing manner.

The TACTP is designed for some cloud computing applications on the user equipment. In this kind of applications, a local storage service and a local computing service of the UE (for example, storage of private data of a user, which includes formatted data such as a picture, a video, a data file and an electronic mail, and local large application software such as office software, CAD/CAM/CAE software, and a network game) may be provided in a cloud computing manner. Typically, forms such as SaaS and PaaS may be adopted. In this case, the TACTP integrated in the base station 40 functions as a proxy server, including terminating a transport layer protocol (TCP/UDP) of a cloud tenant on the UE side, and compressing and buffering data between the cloud tenant on the UE side and a cloud server end (for example, a corresponding cloud service entity in the cloud server end). Specifically, the TACTP may aggregate, compress, or buffer data between the UE and the corresponding cloud service entity; and when receiving a request that is for the data and is sent by the UE to the cloud service entity, send the data to the UE, and stop forwarding the request to the cloud service entity.

The TACTP terminates a transport layer protocol (TCP/UDP) of a cloud end on the UE side, so that the base station 40 may implement inter-layer joint optimization of a transmission control protocol layer and a wireless access layer, thereby making full use of a wireless resource and maximizing a system throughput. The TACTP aggregates/compresses/buffers data between a cloud tenant on the UE side and a corresponding cloud service entity, so that data transmission delay and a data rate between the cloud tenant on the UE side and the corresponding cloud service entity may be decreased, and a response speed of a system to the cloud tenant on the UE side may be increased, thereby improving experience of a user in obtaining a service such as SaaS or PaaS. For example, a terminal user stores picture and video data thereof by using a cloud storage manner, and for some frequently used pictures and video clips, the TACTP may perform buffering, so as to increase a speed that the user obtains the data, thereby improving user experience.

Figure 5:
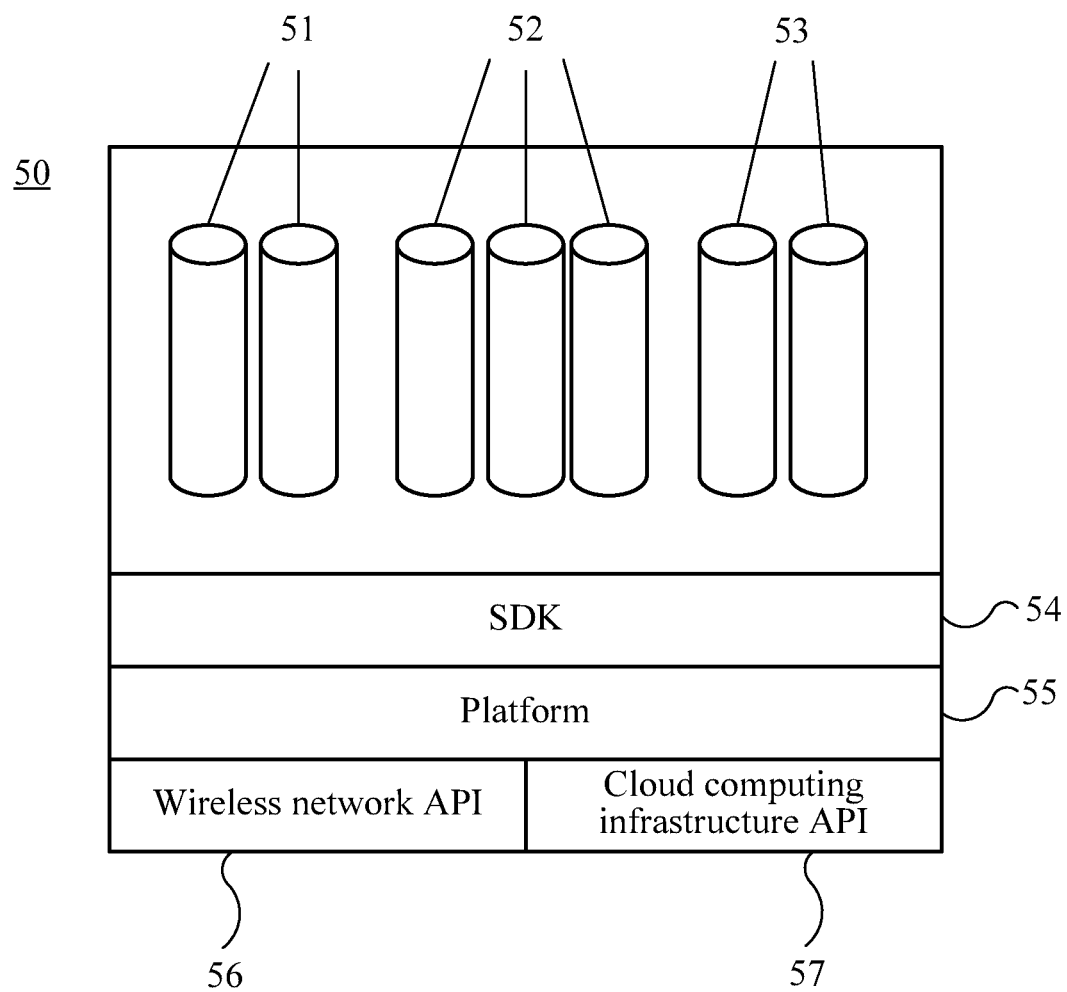
FIG. 5 is a schematic structural diagram of a cloud computing architecture according to an embodiment of the present invention.

FIG. 5 is a schematic structural diagram of a cloud computing architecture according to an embodiment of the present invention. In the architecture shown in FIG. 5, a central cloud adopts a platform cloud (that is, PaaS) manner.

As shown in FIG. 5, there are three kinds of applications on a platform cloud 50, that is, a wireless network function application 51, a third-party application 52, and a terminal cloud application 53, which correspond to cloud end functions of a WNFCT, an ASCT, and a TACTP in an eNB+ respectively, and provides a function of a server.

The wireless network function application 51 and the third-party application 52 support multi-tenant, that is, a virtual server may support multiple UEs at the same time. Typically, the wireless network function application 51 is typically provided by a mobile network equipment provider, and the latter two kinds of applications 52 and 53 are provided by a mobile broadband content provider.

The platform cloud 50 provides a rich software development kit (SDK) 54 for development and operation of an application, which typically includes a programming language, a software framework, a data storage model, a function library, application development and debugging tools, and so on. A platform layer 55 is under the SDK 54, and is responsible for providing a virtual server based runtime environment, a network application development framework, and a Web 2.0 application interface for an application. A wireless network application programming interface (API) 56 and a cloud computing infrastructure API 57 are under the platform layer 55, and provide an application programming interface related to a wireless network and an application programming interface related to a cloud computing infrastructure such as a data center for the platform layer 55 and an upper layer respectively.

A function of the wireless network API 56 is to provide an API for the wireless network function application 51, so that the central cloud can complete wireless network-related data storage (such as subscriber service subscription information, user account information, and user location information) and computing functions (such as data base searching and query and data encryption), that is, functions of network elements such as an HLR/HSS, a PCRF, a Location Server, a Presence Server, and an AAA Server. Another function of the wireless network API 56 is to provide, for the third-party application 52, wireless network-related information obtained from an eNB+, such as an instantaneous SINR of a wireless link, a code modulation manner, a wireless channel condition (such as an average path loss and an average SINR), and an air interface load status, so that the third-party application 52 uses the underlying information to perform inter-layer optimization, such as channel-source joint coding. Meanwhile, the third-party application 52 may also transfer application-related information, such as a service type and QoS, to the wireless network API 56, and in this way, the eNB+ may also obtain the application-related information through a Z2 interface, so as to optimize a wireless transmission channel, and provide effective QoS guarantee for an application.

As described in the following, the ASCT and the TACTP are integrated in the eNB+, and therefore, they directly terminate a transport layer protocol (TCP/UDP) on a UE side, so that inter-layer joint optimization of a transmission control protocol layer and a wireless access layer may be directly completed without involvement of the central cloud. In addition, a function of the TACTP for compressing and buffering data between a cloud end on the UE side and a corresponding cloud service entity does not need involvement of the central cloud either, and is completed by the TACTP independently. Implementation of effective QoS guarantee and channel-source joint coding is completed through the wireless network-related application programming interface by the central cloud and the eNB+ together.

The following further describes how a UE accesses a wireless communications network and uses a mobile broadband (MBB) service and a terminal cloud service in the network architecture provided in the present invention. When the UE is in a coverage area of an eNB+, through an existing air interface access process, the UE establishes one or more wireless network bearer channels with a wireless network function entity (including access layer and non-access layer functions) of the eNB+, so that an IP transmission channel is established between an application layer of the UE and an upper layer function entity (an ASCT and a TACTP) of the eNB+. In a process of establishing the wireless network bearer channel between the UE and the wireless network function entity of the eNB+, a WNFCT function entity of the eNB+ obtains wireless network function-related control services from the central cloud in a cloud computing manner, such as query of subscriber subscription data, user authentication, policy control on the wireless network bearer channel, and accounting.

When the application layer of the UE operates a common MBB service, a transport layer (TCP/UDP) of a Client of a mobile broadband application on the UE side is terminated at the ASCT function entity in the eNB+, and the ASCT adopts a cloud computing manner, in which through a cloud end of an application server integrated in the eNB+, the data center provides a function of an application server in the prior art in a form such as a virtual server. In this way, from the perspective of the UE, the application server in the prior art is located in the eNB+. As described in the foregoing, the third-party application in the data center is responsible for transferring information such as a service type and QoS to a wireless network-related application programming interface, the ASCT function entity in the eNB+ obtains the application-related information through a Z2 interface, and the wireless network function entity in the eNB+ obtains the application-related information through an internal interface with the ASCT, so as to provide effective QoS guarantee for a service. Meanwhile, the ASCT terminates the transport layer protocol of the Client of the mobile broadband application on the UE side, and real-time status information of a wireless link and a wireless resource (such as code modulation information of the wireless link, a wireless channel condition, and an air interface load status) may be obtained from the wireless network function entity in the eNB+. Therefore, the eNB+ may implement inter-layer joint optimization of a transmission control protocol layer and a wireless access layer, thereby making full use of a wireless resource and maximizing a system throughput. In addition, the ASCT can further obtain real-time status information of the wireless link and the wireless resource from the wireless network function entity in the eNB+, and transfer the real-time status information to the wireless network related-application programming interface of the data center through the Z2 interface, so as to provide, for a third-party application APP, wireless network-related information obtained from the eNB+, such as an instantaneous SINR of the wireless link, a code modulation manner, a wireless channel condition (such as an average path loss and an average SINR), and an air interface load status, so that the third-party application APP uses the underlying information to perform inter-layer optimization, such as channel-source joint coding, that is, to implement channel-source joint coding for a service including media such as a video and an image, that is, to jointly select an optimal coding manner and coding rate of the media such as the video and the image, and a channel coding manner and modulation manner of the wireless link according to the real-time status information of the wireless link (for example, an SINR) and based on principles of a maximum system throughput and ensuring of unchanged user experience.

When the UE obtains a cloud service directly in a form such as SaaS or PaaS, the TACTP integrated in the eNB+ functions as a proxy server, including terminating a transport layer protocol (TCP/UDP) of a cloud end on the UE side, and compressing and buffering data between the cloud end on the UE side and a corresponding cloud service entity. The transport layer protocol (TCP/UDP) of the cloud end on the UE side is terminated, so that the eNB+ may implement inter-layer joint optimization of a transport layer (TCP/UDP) and a wireless access layer, thereby making full use of a wireless resource and maximizing a system throughput. The data between the cloud end on the UE side and the corresponding cloud service entity is aggregated/compressed/buffered, so that data transmission delay and a data rate between the cloud end on the UE side and the corresponding cloud service entity may be decreased, and a response speed of a system to the cloud end on the UE side may be increased, thereby improving experience of a user in obtaining a service such as SaaS or PaaS.

The third-party application 52 and the terminal cloud application 53 may be applications that run on a data center and a corresponding software platform (for example, the platform cloud shown in FIG. 5) that are provided by an operator, and may also be applications from a data center and a corresponding software platform of another operator, or applications on a data center and a corresponding software platform of some large information technology (IT) companies, so that interconnection between different types of clouds may be implemented through a Y1 interface shown in FIG. 5.

Figure 6:
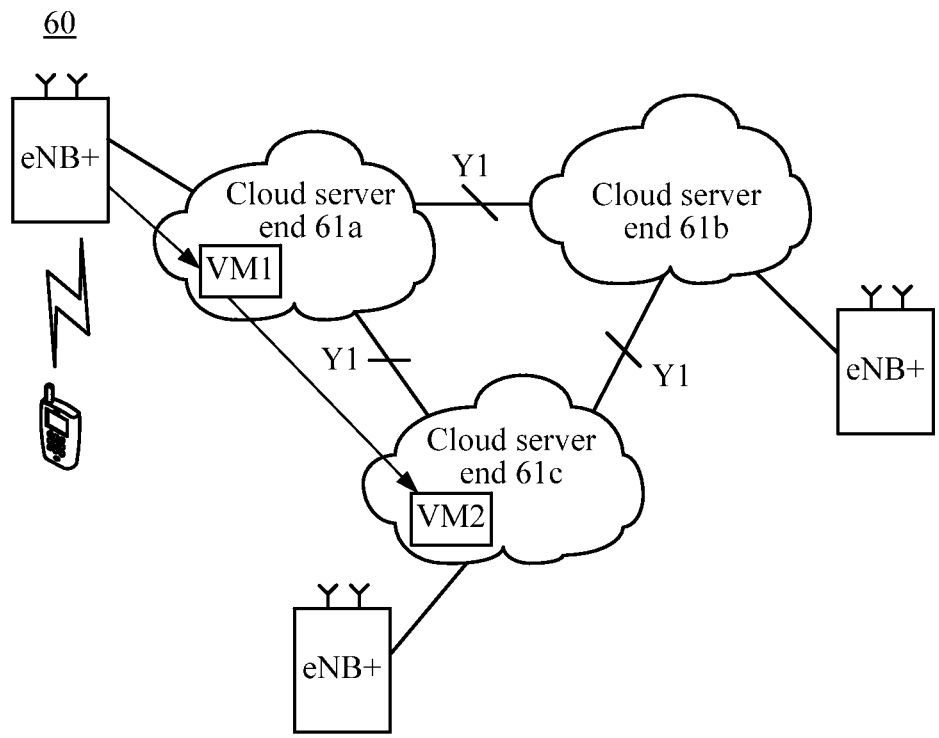
FIG. 6 is a schematic structural diagram of a cloud computing system according to an embodiment of the present invention.

A simple inter-cloud interconnection manner is using a proxy server mechanism. FIG. 6 is a schematic structural diagram of a cloud computing system according to an embodiment of the present invention. A cloud computing system 60 shown in FIG. 6 includes multiple cloud server ends 61a, 61b, and 61c. Each of the cloud server ends 61a, 61b, and 61c is connected to its respective enhanced base station eNB+. It should be noted that the number of network elements shown in FIG. 6 is only exemplary, but is not intended to limit the scope of the embodiment of the present invention.

An application server cloud tenant (ASCT) is activated in the eNB+ that is connected to the cloud server end 61a, and a virtual server corresponding to the application server cloud tenant is in the cloud server end 61a, that is, a VM1 shown in FIG. 6. The VM1 does not provide an application directly, because the application is not directly provided by the cloud server end 61a, but is provided by the cloud server end 61c. Therefore, The VM1 is equivalent to a back-to-back proxy, that is, a virtual server operating a corresponding application for the eNB+ that is connected to the cloud server end 61a, but is equivalent to a cloud tenant for a virtual server VM2 in the cloud server end 61c that actually operates an application. In this way, the VM1 may obtain a corresponding cloud service from the VM2, and transfer the corresponding service to a corresponding ASCT function of the eNB+ in the cloud server end 61a.

Figure 7:
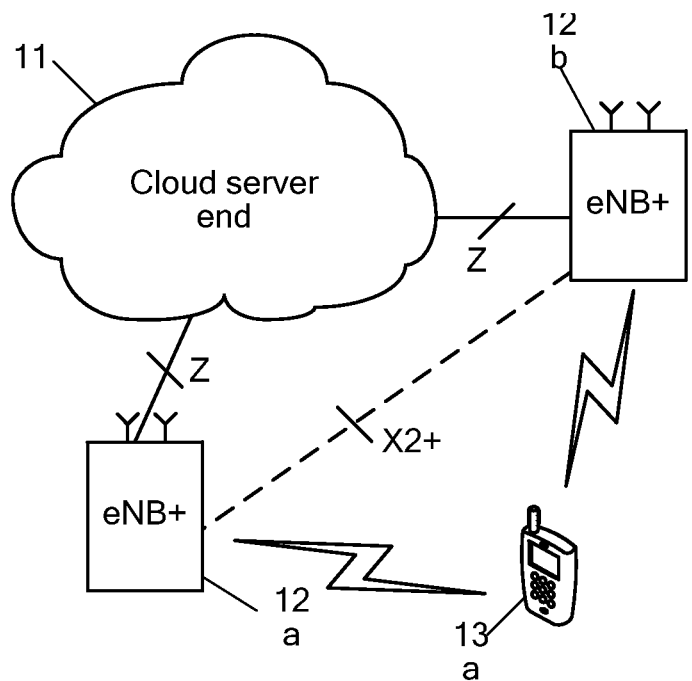
FIG. 7 is a schematic diagram of mobility management in a cloud computing system according to an embodiment of the present invention.

FIG. 7 is a schematic diagram of mobility management in a cloud computing system according to an embodiment of the present invention. In FIG. 7, parts that are the same as or similar to those in FIG. 1 use the same reference numerals.

A detailed process of mobility management is described in the following with reference to FIG. 1. When a UE moves from a coverage area of an eNB+ 12a to a coverage area of another eNB+ 12b, two layers of handovers occur, that is, an air interface handover and a cloud tenant handover. An X2+ interface directly exists between the eNB+ 12a and the eNB+ 12b, so that an inter-eNB+ wireless access layer handover and wireless non-access layer relocation may be completed by using the X2+ interface. A specific handover process is similar to an X2 interface-based inter-eNB wireless access layer handover in an existing LTE technology, but a difference lies in that in the existing LTE technology, a wireless non-access layer function entity is located in a core network, so that an inter-eNB wireless access layer handover does not directly cause wireless non-access layer relocation, but in the embodiment of the present invention, a wireless access layer and a wireless non-access layer are both integrated in an eNB+, so that the wireless non-access layer relocation and the inter-eNB+ wireless access layer handover are performed at the same time. In this case, an IP address of a UE is also reconfigured with the inter-eNB+ wireless non-access layer relocation.

Handovers of a WNFCT, an ASCT, and a TACTP cloud tenant are performed at the same time with the inter-eNB+ wireless access layer handover. By adopting cloud computing, an entity that actually operates an application is a virtual server located at a data center. Therefore, a handover of a cloud tenant corresponding to one UE does not affect an operating status of a corresponding wireless network function application, a third-party application, and a terminal cloud application. In this way, for an application, when a UE performs inter-eNB+ movement, only a cloud tenant corresponding to the UE undergoes a handover, but an application running on a central cloud virtual server is not affected. Therefore, handovers of the WNFCT, the ASCT, and the TACTP cloud tenant may be performed in a manner similar to a "soft handover".

Specifically, when the UE undergoes an inter-eNB+ wireless access layer handover and/or wireless non-access layer relocation, at the same time when a cloud tenant of the UE is run on a source eNB+ 12a, a copy of the cloud tenant of the UE is started in a target eNB+ 12b, and the two cloud tenants are completely synchronized to a corresponding application in a central cloud. In this way, application layer seamless mobility of the UE can be ensured, and when the whole inter-eNB+ movement process is completed, the cloud tenant of the UE in the source eNB+ 12a is stopped.

Figure 8:
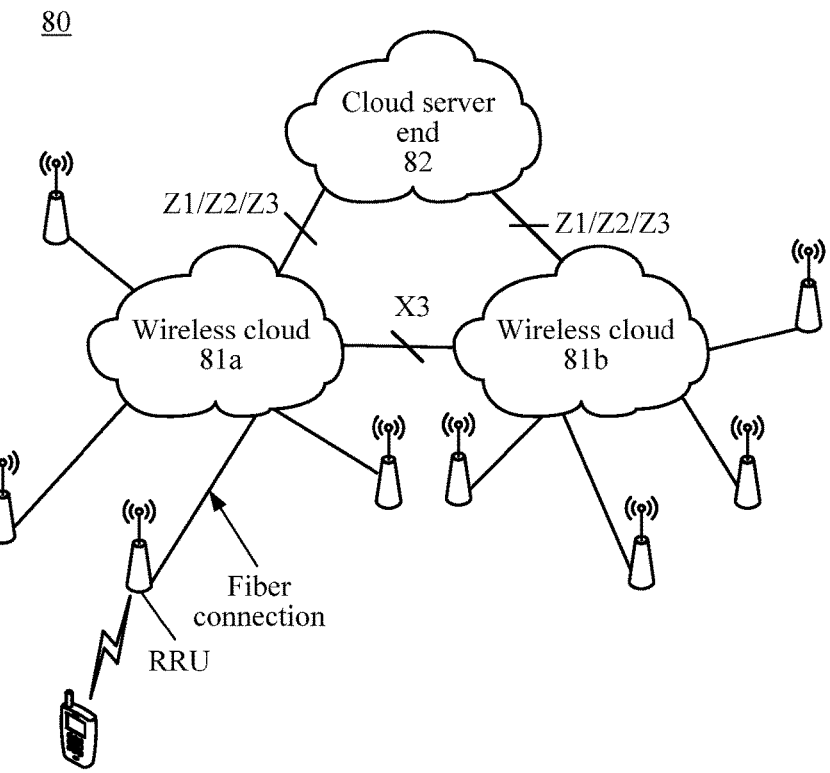
FIG. 8 is a schematic structural diagram of a cloud computing system according to another embodiment of the present invention.

FIG. 8 is a schematic structural diagram of a cloud computing system according to another embodiment of the present invention. A cloud computing system 80 shown in FIG. 8 is a network architecture where a wireless cloud and an application cloud are integrated. The wireless cloud is also called a cloud radio access network (cloud RAN or C-RAN), and is a radio access network architecture that is mostly concerned recently. A main feature of the architecture is that a base band processing unit (BBU) and a radio frequency unit of a conventional base station are separated. For example, BBUs of multiple base stations are concentrated to form one or more wireless clouds 81a and 81b, and are connected to a radio remote unit (RRU) through a broadband transmission line such as a fiber.

The wireless clouds 81a and 81b complete all functions of a wireless cellular system (a wireless access layer function such as PHY/MAC/RLC/PDCP, and a non-access layer function such as an L3 protocol and a PDN gateway). In addition, the wireless clouds 81a and 81b may further include the three function entities on the wireless non-access layer shown in FIG. 4, that is, the WNFCT, the ASCT, and the TACTP, and are connected to a cloud server end (or called a central cloud) 82 through Z1, Z2, and Z3 interfaces respectively. The wireless clouds 81a and 81b are interconnected through an X3 interface. The interface is similar to the X2+ interface in FIG. 4, and is used to support mobility between the wireless clouds.

Corresponding to the base station shown in FIG. 2, in the embodiment shown in FIG. 8, the receiving module 21 is located in the RRU, and the first processing module 22 is located in the BBU (that is, located in the wireless cloud 81a or 81b formed by the BBU). Concentration of BBUs facilitates virtualization of a base band processing resource by using a cloud computing technology, so as to realize flexible sharing of the base band processing resource, solve a tidal effect of traffic distribution, and realize joint signal processing between multiple cells, thereby eliminating inter-cell interference and increasing system capacity.

The embodiment of the present invention enables a mobile operator to provide a pipe and cloud unified service platform, so as to expand a service scope of the mobile operator, so that the mobile operator not only can provide a pipe service, but also can provide information services such as storage and computing. In addition, the embodiment of the present invention facilitates implementation of inter-layer optimization of an application layer/a transport layer and a wireless bearer underlying layer, so as to improve system performance, and facilitates learning of QoS information of an application, so that a system can provide end-to-end QoS guarantee for various applications.

Figure 9:
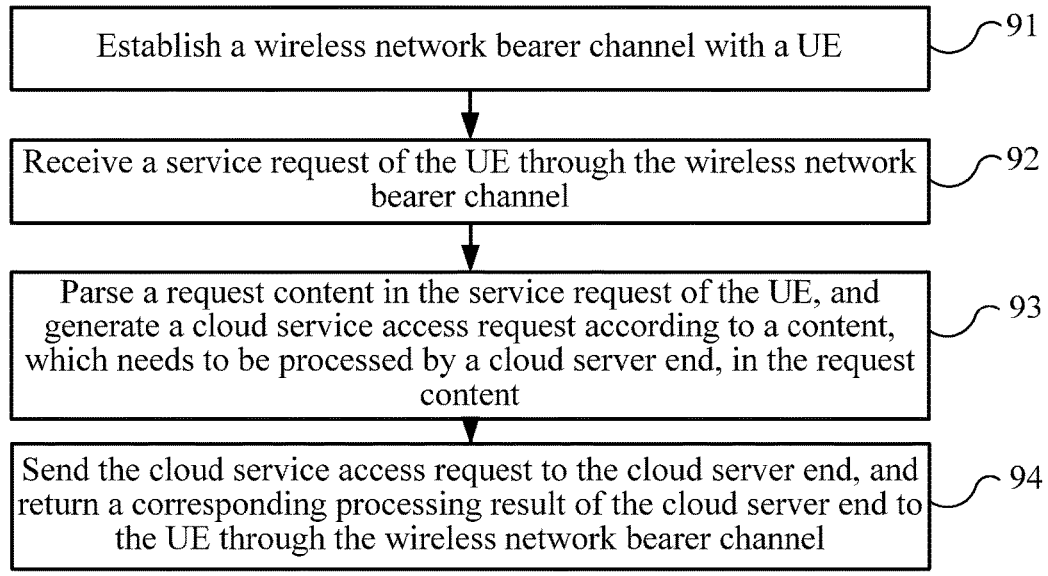
FIG. 9 is a flow chart of a service processing method according to an embodiment of the present invention.

FIG. 9 is a flow chart of a service processing method according to an embodiment of the present invention. The method shown in FIG. 9 is executed by a base station, for example, the eNB+ shown in FIG. 1 or the base stations 20 to 40.

91: Establish a wireless network bearer channel with a UE. For example, the wireless network bearer channel may be established by implementing an existing wireless network access layer protocol and non-access layer protocol.

92: Receive a service request of the UE through the wireless network bearer channel.

93: Parse a request content in the service request of the UE, and generate a cloud service access request according to a content, which needs to be processed by a cloud server end, in the request content.

After obtaining the request content through parsing, the base station decides how to perform processing. For example, for a content that can be processed by the base station, such as inter-layer optimization, joint coding processing, and data compression/aggregation/buffering, the base station may perform the processing. For a content that needs to be processed by a cloud server end, such as data storage/computing, the base station may send a cloud service access request to a corresponding cloud server end, so as to request the cloud server end to perform corresponding processing.

94: Send the cloud service access request to the cloud server end, and return a corresponding processing result of the cloud server end to the UE through the wireless network bearer channel.

In this way, from the perspective of the user equipment, it is like that an application server is located in the base station. The user equipment sends a service request directly to the base station (which is different from the prior art where a user equipment sends a service request to an application server, and a base station just simply forwards the service request on an access layer). That is, the base station terminates a transport layer protocol of the user equipment. However, in the prior art, a user equipment sends a service request to an application server, but a base station does not parse a request content in the service request, and simply searches for a route and forwards the service request according to information such as a destination address of the service request (the information is usually in a packet header of a service request packet).

In the embodiment of the present invention, a wireless network bearer channel is established between a base station and a user equipment, so as to terminate an access layer protocol of the user equipment. In addition, from the perspective of a transport layer protocol, the base station in the embodiment of the present invention does not simply forward a service request of the user equipment, but parses a request content in the service request, and performs processing according to the request content, or requests a cloud server end to help perform processing, so that a transport layer protocol and an access layer protocol of a user equipment side are both terminated at a base station. Therefore, in the embodiment of the present invention, inter-layer optimization of a transport layer and an access layer can be implemented.

The service processing method according to the embodiment of the present invention may further include other processes executed by parts of the base station. An example is given for description with reference to the base station 30 shown in FIG. 3. For example, a wireless network function module may implement a wireless network access layer protocol and non-access layer protocol, and establish one or more network bearer channels with a UE.

Optionally, as another embodiment, the first processing module 22 may obtain application-related information such as application property information and/or signal source coding information of a service corresponding to a service request. For example, the first processing module 22 may obtain the application-related information when parsing a request content in the service request of the UE. Alternatively, the first processing module 22 may also obtain the application-related information from other sources (for example, a cloud server end or a cloud service entity corresponding to an application). The wireless network function module 24 may further obtain the application property information and/or the signal source coding information from the first processing module 22, and realize quality of service guarantee by using the application property information and/or the signal source coding information.

Optionally, as another embodiment, the wireless network function module 24 may obtain application-related information such as real-time status information of a wireless link and/or a wireless resource on the wireless network bearer channel. The wireless network function module 24 may obtain the real-time status information of the wireless link and/or the wireless resource in any existing manner, which is not limited in the present invention. The first processing module 22 may also obtain the real-time status information of the wireless link and/or the wireless resource from the wireless network function module 24, and complete inter-layer joint optimization of a transmission control protocol layer and a wireless access layer according to the real-time status information of the wireless link and/or the wireless resource. In addition, the first processing module 22 may further provide the real-time status information of the wireless link and/or the wireless resource for a third-party application, so that the third-party application performs inter-layer optimization by using the real-time status information of the wireless link and/or the wireless resource.

In addition, when the wireless network function module 24 establishes the wireless network bearer channel with the UE, reference may be made to the application-related information.

Optionally, as another embodiment, the third processing module 25 may aggregate, compress, or buffer data between the UE and a corresponding cloud service entity; and when receiving a request that is for the data and is sent by the UE to the cloud service entity, send the data to the UE, and stop forwarding the request to the cloud service entity.

Optionally, as another embodiment, when the UE undergoes an inter-base station wireless access layer handover and/or wireless non-access layer relocation, and at the same time when a first processing module of a current base station serves the UE, the mobility management module 26 starts a copy of the first processing module of the current base station in a first processing module of a target base station, and synchronizes the first processing module of the current base station and the first processing module of the target base station to a corresponding application in the cloud server end.

The cloud computing system according to the embodiment of the present invention may include multiple cloud server ends (for example, 61a, 61b, and 61c shown in FIG. 6), and the multiple cloud server ends are interconnected. Each cloud server end is connected to one or more base stations 20 to 40.

Persons of ordinary skill in the art may appreciate that, in combination with the examples described in the embodiments disclosed in this specification, units and algorithm steps may be implemented by electronic hardware, computer software, or a combination of the two. In order to clearly describe the interchangeability between hardware and software, the foregoing has generally described compositions and steps of every example according to functions. Whether these functions are performed by hardware or software depends on particular applications and design constraint conditions of the technical solutions. Persons skilled in the art may use a different method to implement the described functions for each particular application, but it should not be considered that such implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that the disclosed system, apparatus, and method may be implemented in other manners. For example, the described apparatus embodiment is only exemplary. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions in the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit are implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of steps of the methods described in the embodiments of the present invention. The foregoing storage medium includes: any medium that can store program codes, such as a universal serial bus (USB) flash disk, a removable hard disk, a read-only memory (ROM), a random access memory (RAM), a magnetic disk, or an optical disk.

The foregoing descriptions are only specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A base station, comprising:
    a processor configured to establish a wireless network bearer channel with a user equipment (UE); and
    a receiver coupled to the processor and configured to receive a service request of the UE through the wireless network bearer channel,
    wherein the processor is further configured to:
        parse a content of the service request of the UE, at least part of the parsed content needing to be processed by a cloud server;
        generate a cloud service request according to the at least part of the parsed content by terminating a transport layer protocol of the UE and an access layer protocol of the UE;
        send the cloud service request to the cloud server;
        receive from the cloud server a processing result that corresponds to the cloud service request; and
        send the processing result to the UE through the wireless network bearer channel.

2. The base station of claim 1, wherein the processor is further configured to obtain a function control service of the wireless network bearer channel from the cloud server in a cloud computing manner.

3. The base station of claim 1, wherein the processor is further configured to establish the wireless network bearer channel with the UE by implementing a wireless network access layer protocol and a non-access layer protocol.

4. The base station of claim 3, wherein the service request of the UE carries application property information of a service corresponding to the service request, and the processor is further configured to:
    obtain the application property information by parsing the service request of the UE; and
    realize quality of service guarantee using the application property information.

5. The base station of claim 3, wherein the processor is further configured to:
    obtain real-time status information of at least one of a wireless link and a wireless resource on the wireless network bearer channel; and
    complete inter-layer joint optimization of a transmission control protocol layer and a wireless access layer according to the real-time status information.

6. The base station of claim 5, wherein the processor is further configured to provide the real-time status information to a third-party application.

7. The base station of claim 1, wherein the processor is further configured to provide a proxy service for a cloud computing application on the UE.

8. The base station of claim 7, wherein the processor is further configured to:
    perform at least one of aggregating, compressing, and buffering of data between the UE and a cloud service entity;
    receive a request that is for the data, from the UE, and destined for the cloud service entity; and
    send the data to the UE.

9. The base station of claim 1, wherein the processor is further configured to:
    start a second processor of a target base station when the UE undergoes at least one of an inter-base station wireless access layer handover and a wireless non-access layer relocation, and when the processor of the base station serves the UE, the second processor of the target base station being configured to perform the same operations as the processor of the base station; and synchronize the processor of the base station and the second processor of the target base station to a corresponding application in the cloud server.

10. The base station of claim 1, wherein the receiver is located at a radio remote unit of the base station, and the processor is located at a base band processing unit of the base station.

11. A service processing method, comprising:
establishing a wireless network bearer channel with a user equipment (UE);
receiving a service request of the UE through the wireless network bearer channel;
parsing a content in the service request of the UE, at least part of the parsed content needing to be processed by a cloud server;
generating a cloud service request according to the at least part of the parsed content by terminating a transport layer protocol of the UE and an access layer protocol of the UE;
sending the cloud service request to the cloud server;
receiving from the cloud server a processing result that corresponds to the cloud service request; and
sending the processing result to the UE through the wireless network bearer channel.

12. The method of claim 11, wherein the establishing the wireless network bearer channel with the UE comprises establishing the wireless network bearer channel with the UE by implementing a wireless network access layer protocol and a non-access layer protocol.

13. The method of claim 11, further comprising:
obtaining, by parsing the service request of the UE, application property information of a service corresponding to the service request; and
realizing a quality of service guarantee using the application property information.

14. The method of claim 12, further comprising:
obtaining real-time status information of at least one of a wireless link and a wireless resource on the wireless network bearer channel; and
completing inter-layer joint optimization of a transmission control protocol layer and a wireless access layer according to the real-time status information.

15. The method of claim 14, further comprising providing the real-time status information to a third-party application.

16. The method of claim 11, further comprising:
performing at least one of aggregating, compressing, or buffering of data between the UE and a cloud service entity;
receiving a request that is for the data, from the UE, and destined for the cloud service entity; and
sending the data to the UE.

17. A cloud computing system, comprising:
multiple cloud servers intercoupled with each other, each cloud server being coupled to multiple base stations that each comprise:
a processor configured to establish a wireless network bearer channel with a user equipment (UE);
a receiver coupled to the processor and configured to receive a service request of the UE through the wireless network bearer channel,
wherein the processor is further configured to:
parse a content of the service request of the UE, at least part of the parsed content needing to be processed by a selected one of the cloud servers;
generate a cloud service request according to the at least part of the parsed content by terminating a transport layer protocol of the UE and an access layer protocol of the UE;
send the cloud service request to the selected one of the cloud servers;
receive from the selected one of the cloud servers a processing result that corresponds to the cloud service request; and
send the processing result to the UE through the wireless network bearer channel.

18. The base station of claim 3, wherein the service request of the UE carries signal source coding information of a service corresponding to the service request, and the processor is further configured to:
obtain the signal source coding information by parsing the service request of the UE; and
realize quality of service guarantee using the signal source coding information.

19. The method of claim 11, further comprising:
obtaining, by parsing the service request of the UE, signal source coding information of a service corresponding to the service request; and
realizing quality of service guarantee using the signal source coding information.

* * * * *

UNITED STATES PATENT AND TRADEMARK OFFICE
CERTIFICATE OF CORRECTION

PATENT NO. : 10,039,136 B2
APPLICATION NO. : 14/256212
DATED : July 31, 2018
INVENTOR(S) : Sheng Liu It is certified that error appears in the above-identified patent and that said Letters Patent is hereby corrected as shown below:

On the Title Page

Item (30), Line 1: "201110323739" should be "201110323739.2"

Page (2), Item (56), Column 2, OTHER PUBLICATIONS, Line 2: "PCT/CN20121082750" should be "PCT/CN2012/082750"

Page (2), Item (56), Column 2, OTHER PUBLICATIONS, Line 5: "PCT/CN20121082750" should be "PCT/CN2012/082750"

Signed and Sealed this
Twenty-fifth Day of September, 2018

Andrei Iancu
*Director of the United States Patent and Trademark Office*